United States Patent
Clubb (12)

(10) Patent No.: US 6,173,117 B1
(45) Date of Patent: Jan. 9, 2001

(54) HEATED BEVERAGE MACHINE

(76) Inventor: Bobbye L. Clubb, 7481 SE. Sellers La., Holt, MO (US) 64048

( * ) Notice: Under 35 U.S.C. 154(b), the term of this patent shall be extended for 0 days.

(21) Appl. No.: 09/395,707

(22) Filed: Sep. 14, 1999

(51) Int. Cl.[7] .................................................. F24H 1/18
(52) U.S. Cl. .......................... 392/442; 99/279; 222/146.5
(58) Field of Search ............................... 392/442, 446; 222/129, 146.5; 99/279, 280, 316

(56) References Cited

U.S. PATENT DOCUMENTS

| | | | |
|---|---|---|---|
| 2,819,377 | 1/1958 | Brown | 219/38 |
| 2,894,110 | 7/1959 | Brown | 219/38 |
| 3,075,452 | 1/1963 | Brandl | 99/281 |
| 4,015,749 * | 4/1977 | Arzberger et al. | 222/640 |
| 5,142,610 | 8/1992 | Augustine et al. | 392/442 |
| 5,570,816 | 11/1996 | La Barbera, Jr. | 222/129.4 |
| 5,671,325 | 9/1997 | Roberson | 392/442 |
| 5,836,236 * | 11/1998 | Rolfes et al. | 99/290 |

* cited by examiner

*Primary Examiner*—Philip H. Leung
*Assistant Examiner*—Thor Campbell
(74) *Attorney, Agent, or Firm*—Joseph N. Breaux

(57) ABSTRACT

A beverage preparing machine that includes reservoirs for storing a quantity of powdered drink mix, such as a powdered baby formula mix, and a volume of water, a water dispensing mechanism that includes a heating element for dispensing a given volume of heated water into a mixing nozzle and a powdered drink mix dispensing assembly for simultaneously dispensing a volume of powdered drink mix into the mixing nozzle. The mixing nozzle having a dispensing opening for filling a container such as a baby bottle.

3 Claims, 4 Drawing Sheets

HEATED BEVERAGE MACHINE

TECHNICAL FIELD

The present invention relates to beverage machines and more particularly to a heated beverage machine for use in making heated beverages, such as baby formula and cocoa, from heated water and a powdered drink mix that includes a housing having contained therein water dispensing assembly, a powdered drink mix dispensing assembly, and a control circuit; the water dispensing assembly including a water reservoir, a water reservoir level sensor, a water temperature sensor, three fluid volume select input buttons, a warm/hot select switch, a water dispensing valve in connection between the water reservoir and a mixing nozzle, a resistance heating element, a water temperature display gauge, a water level display gauge, a warm temperature select indicator light, and a hot temperature select indicator light; the powdered drink mix dispensing assembly including powdered drink mix reservoir, a dispensing auger positioned within a dispensing pipe in connection between the mixing nozzle and the powdered drink mix reservoir, a dispensing auger position sensor, a shaker assembly positioned within the powdered drink mix reservoir, and a dispensing auger motor; the control circuit having inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light; the control circuit operating the dispenser auger motor and the water dispensing valve such that the volume of powdered drink mix and water dispensed corresponds with the volume of the fluid volume select input button selected in response to activation of the start mix switch; the control circuit operating the resistance heating element to heat dispensed water exiting the water dispensing valve to the temperature corresponding to the position of the warm/hot select switch before the dispensed water reaches the mixing nozzle; the mixing nozzle being positioned outside of the housing and having a dispensing opening for dispensing a mixture of the dispensed water and powdered beverage mix.

BACKGROUND ART

Preparing baby formula from a powdered drink mix can be time consuming. It would be desirable, therefore to have a heated beverage machine that included reservoirs for storing a quantity of powdered drink mix and a volume of water, a water dispensing mechanism that included a heating element for dispensing a given volume of heated water into a mixing nozzle and a powdered drink mix dispensing assembly for simultaneously dispensing a volume of powdered drink mix into the mixing nozzle.

GENERAL SUMMARY DISCUSSION OF INVENTION

It is thus an object of the invention to provide a heated beverage machine that includes a housing having contained therein a water dispensing assembly, a powdered drink mix dispensing assembly, and a control circuit; the water dispensing assembly including a water reservoir, a water reservoir level sensor, a water temperature sensor, three fluid volume select input buttons, a warm/hot select switch, a water dispensing valve in connection between the water reservoir and a mixing nozzle, a resistance heating element, a water temperature display gauge, a water level display gauge, a warm temperature select indicator light, and a hot temperature select indicator light; the powdered drink mix dispensing assembly including powdered drink mix reservoir, a dispensing auger positioned within a dispensing pipe in connection between the mixing nozzle and the powdered drink mix reservoir, a dispensing auger position sensor, a shaker assembly positioned within the powdered drink mix reservoir, and a dispensing auger motor; the control circuit having inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light; the control circuit operating the dispenser auger motor and the water dispensing valve such that the volume of powdered drink mix and water dispensed corresponds with the volume of the fluid volume select input button selected in response to activation of the start mix switch; the control circuit operating the resistance heating element to heat dispensed water exiting the water dispensing valve to the temperature corresponding to the position of the warm/hot select switch before the dispensed water reaches the mixing nozzle; the mixing nozzle being positioned outside of the housing and having a dispensing opening for dispensing a mixture of the dispensed water and powdered beverage mix.

Accordingly, a heated beverage machine is provided. The heated beverage machine includes a housing having contained therein a water dispensing assembly, a powdered drink mix dispensing assembly, and a control circuit; the water dispensing assembly including a water reservoir, a water reservoir level sensor, a water temperature sensor, three fluid volume select input buttons, a warm/hot select switch, a water dispensing valve in connection between the water reservoir and a mixing nozzle, a resistance heating element, a water temperature display gauge, a water level display gauge, a warm temperature select indicator light, and a hot temperature select indicator light; the powdered drink mix dispensing assembly including powdered drink mix reservoir, a dispensing auger positioned within a dispensing pipe in connection between the mixing nozzle and the powdered drink mix reservoir, a dispensing auger position sensor, a shaker assembly positioned within the powdered drink mix reservoir, and a dispensing auger motor; the control circuit having inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light; the control circuit operating the dispenser auger motor and the water dispensing valve such that the volume of powdered drink mix and water dispensed corresponds with the volume of the fluid volume select input button selected in response to activation of the start mix switch; the control circuit operating the resistance heating element to heat dispensed water exiting the water dispensing valve to the temperature corresponding to the position of the warm/hot select switch before the dispensed water reaches the mixing nozzle; the mixing nozzle being positioned outside of the housing and having a dispensing opening for dispensing a mixture of the dispensed water and powdered beverage mix.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
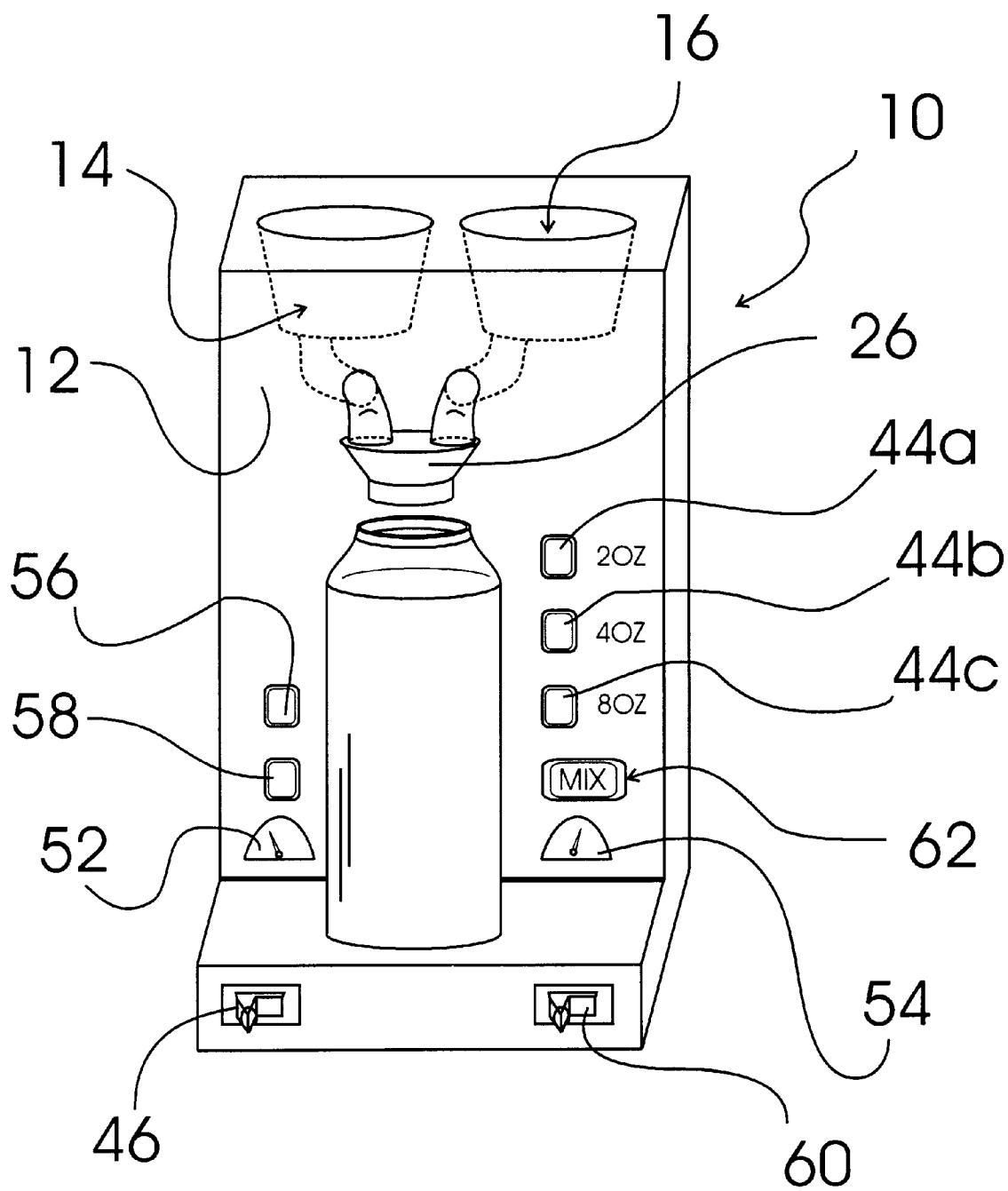
FIG. 1 is a perspective view of an exemplary embodiment of the heated beverage machine of the present invention showing the housing having contained therein a water dispensing assembly, a powdered drink mix dispensing assembly, and a control circuit; the water dispensing assembly including a water reservoir, a water reservoir level sensor, a water temperature sensor, three fluid volume select input buttons, a warm/hot select switch, a water dispensing valve in connection between the water reservoir and a mixing nozzle, a resistance heating element, a water temperature display gauge, a water level display gauge, a warm temperature select indicator light, and a hot temperature select indicator light; the powdered drink mix dispensing assembly including powdered drink mix reservoir, a dispensing auger positioned within a dispensing pipe in connection between the mixing nozzle and the powdered drink mix reservoir, a dispensing auger position sensor, a shaker assembly positioned within the powdered drink mix reservoir, and a dispensing auger motor; the control circuit having inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light; the control circuit operating the dispenser auger motor and the water dispensing valve such that the volume of powdered drink mix and water dispensed corresponds with the volume of the fluid volume select input button selected in response to activation of the start mix switch; the control circuit operating the resistance heating element to heat dispensed water exiting the water dispensing valve to the temperature corresponding to the position of the warm/hot select switch before the dispensed water reaches the mixing nozzle.

FIG. 1 shows an exemplary embodiment of the heated beverage machine of the present invention generally designated 10. Heated beverage machine 10 includes a housing 12 having contained therein a water dispensing assembly, generally designated 14; a powdered drink mix dispensing assembly, generally designated 16; and a programmable control circuit, generally designated 18 (FIG. 4).

Figure 2:
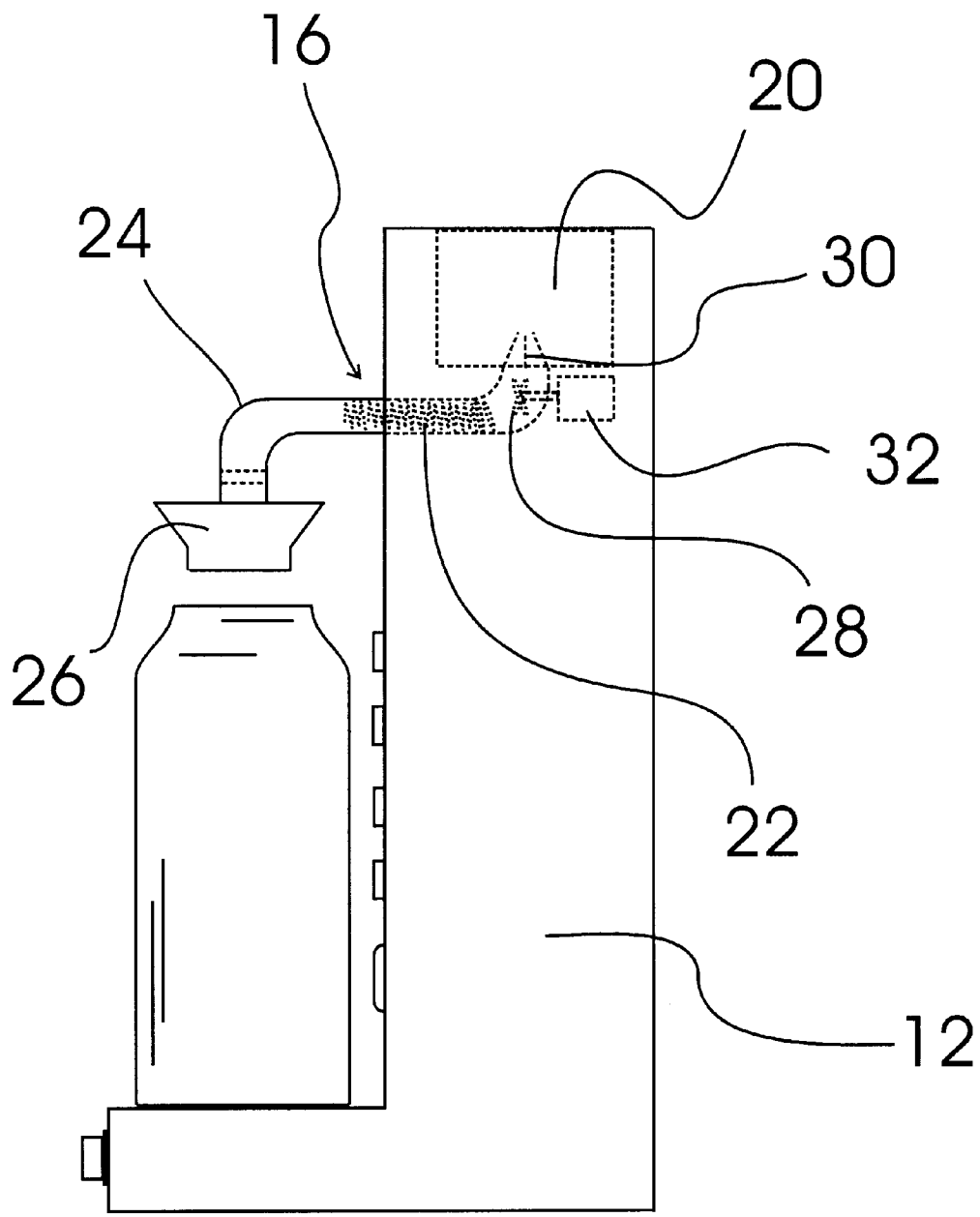
FIG. 2 is a side plan view of the heated beverage machine of FIG. 1 showing the mixing nozzle, the powdered drink mix reservoir, the dispensing auger, the shaker assembly positioned within the powdered drink mix reservoir, and the dispensing auger motor.

Referring to FIG. 2, powdered drink mix dispensing assembly 16 includes a powdered drink mix reservoir 20, a dispensing auger 22 positioned within a dispensing pipe 24 in connection between a mixing nozzle 26 and powdered drink mix reservoir 20, a dispensing auger position sensor 28, a shaker assembly 30 positioned within powdered drink mix reservoir 20, and a dispensing auger motor 32.

Figure 3:
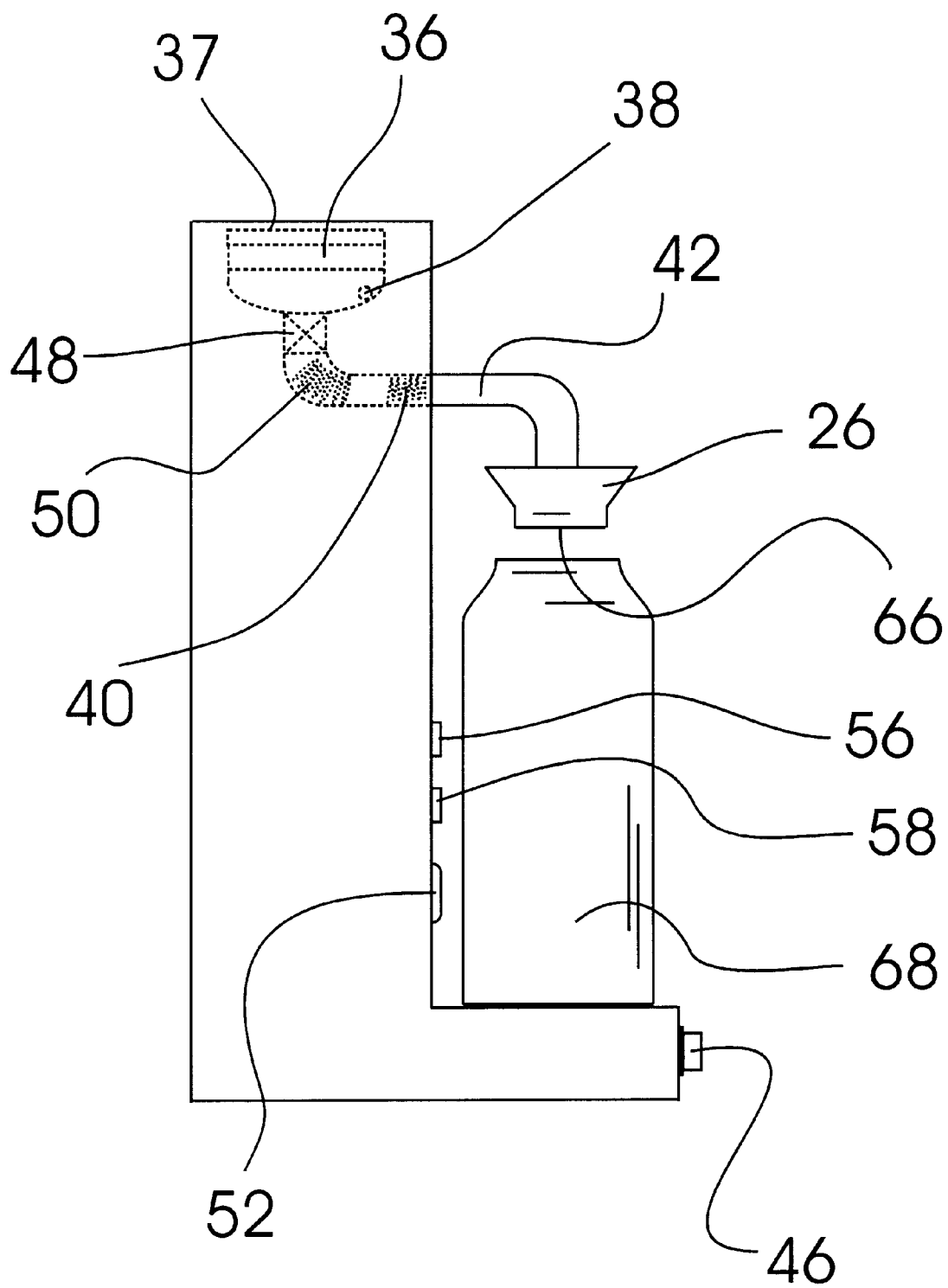
FIG. 3 is a side plan view of the heated beverage machine of FIG. 1 showing the water reservoir, the water reservoir level sensor, the water temperature sensor, the water dispensing valve, the resistance heating element, and the mixing nozzle.

Referring to FIG. 3, water dispensing assembly includes a water reservoir 36, a water filter 37 positioned over the fill opening of water reservoir 36, a level sensor 38 positioned within water reservoir 36, a water temperature sensor 40 positioned within a water dispensing pipe 42, three fluid volume select input buttons 44a–c (FIG. 1), a warm/hot select switch 46 (see also FIG. 1), a water dispensing valve 48 in connection between water reservoir 36 and mixing nozzle 26, a resistance heating element 50 positioned within water dispensing pipe 42, a water temperature display gauge 52, a water level display gauge 54 (FIG. 1), a warm temperature select indicator light 56, and a hot temperature select indicator light 58. Water filter 37 allows the use of tap water and other similar sources for making baby formula. Water filter 37 is replaceable and is used to remove taste generating contaminants from tap water and the like that if left in could cause an infant or small child to reject the baby formula because of a bad or unpleasant taste related to the water.

Figure 4:
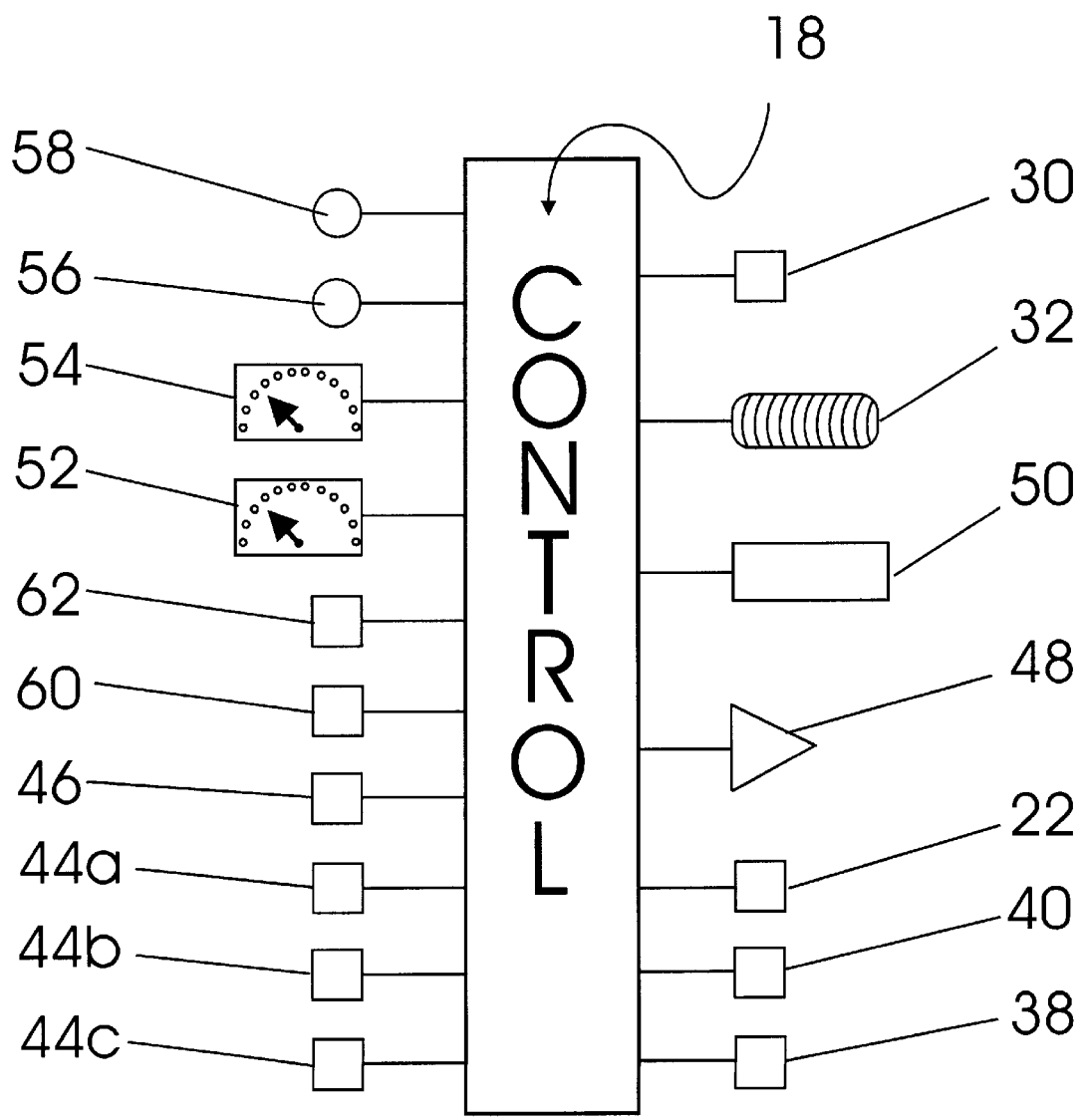
FIG. 4 is a schematic diagram of the control circuit having inputs in electrical connection with the water reservoir level sensor, the water temperature sensor, the dispensing auger position sensor, the three fluid volume select input buttons, the warm/hot select switch, the on/off switch, the start mix switch, and outputs in connection with the water dispensing valve, the resistance heating element, the water temperature display gauge, the water level display gauge, the dispensing auger motor, the warm temperature select indicator light, and the hot temperature select indicator light.

Referring to FIG. 4, control circuit 18 is a conventional programmable microprocessor circuit having inputs in electrical connection with a water reservoir level sensor 38, water temperature sensor 40, dispensing auger position sensor 22, three fluid volume select input buttons 44a–c, warm/hot select switch 46, an on/off switch 60 (see also FIG. 1), a start mix switch 62 (see also FIG. 1), and outputs in connection with water dispensing valve 48, resistance heating element 50, water temperature display gauge 52, water level display gauge 54, dispensing auger motor 32, warm temperature select indicator light 56, and hot temperature select indicator light 58. Control circuit 18 operates the dispenser auger motor 32 and the water dispensing valve 48 such that the volume of powdered drink mix and water dispensed corresponds with the volume of the fluid volume select input button 44a–c selected in response to activation of the start mix switch 62 and resistance heating element 50 is operated to heat the dispensed water exiting the water dispensing valve 48 to the temperature corresponding to the position of the warm/hot select switch 46 before the dispensed water reaches the mixing nozzle 26 and is discharged through a dispensing opening 66 (see FIG. 3) into a container such as baby bottle 68 (FIG. 3).

It can be seen from the preceding description that a heated beverage machine has been provided that includes a housing having contained therein a water dispensing assembly, a powdered drink mix dispensing assembly, and a control circuit; the water dispensing assembly including a water reservoir, a water reservoir level sensor, a water temperature sensor, three fluid volume select input buttons, a warm/hot select switch, a water dispensing valve in connection between the water reservoir and a mixing nozzle, a resistance heating element, a water temperature display gauge, a water level display gauge, a warm temperature select indicator light, and a hot temperature select indicator light; the powdered drink mix dispensing assembly including powdered drink mix reservoir, a dispensing auger positioned within a dispensing pipe in connection between the mixing nozzle and the powdered drink mix reservoir, a dispensing auger position sensor, a shaker assembly positioned within the powdered drink mix reservoir, and a dispensing auger motor; the control circuit having inputs in electrical connection with a water reservoir level sensor, a water temperature sensor, dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light; the control circuit operating the dispenser auger motor and the water dispensing valve such that the volume of powdered drink mix and water dispensed corresponds with the volume of the fluid volume select input button selected in response to activation of the start mix switch; the control circuit operating the resistance heating element to heat dispensed water exiting the water dispensing valve to the temperature corresponding to the position of the warm/hot select switch before the dispensed water reaches the mixing nozzle; the mixing nozzle being positioned outside of the housing and having a dispensing opening for dispensing a mixture of the dispensed water and powdered beverage mix.

It is noted that the embodiment of the heated beverage machine described herein in detail for exemplary purposes is of course subject to many different variations in structure, design, application and methodology. Because many varying and different embodiments may be made within the scope of the inventive concepts(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A heated beverage machine comprising:
    a housing having contained therein a water dispensing assembly, a powdered drink mix dispensing assembly, and a control circuit;
    said water dispensing assembly including a water reservoir, a water reservoir level sensor, a water temperature sensor, three fluid volume select input buttons, a warm/hot select switch, a water dispensing valve in connection between said water reservoir and a mixing nozzle, a resistance heating element, a water temperature display gauge, a water level display gauge, a warm temperature select indicator light, and a hot temperature select indicator light;
    said powdered drink mix dispensing assembly including powdered drink mix reservoir, a dispensing auger positioned within a dispensing pipe in connection between said mixing nozzle and said powdered drink mix reservoir, a dispensing auger position sensor, a shaker assembly positioned within said powdered drink mix reservoir, and a dispensing auger motor;
    said control circuit having inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light;
    said control circuit operating said dispenser auger motor and said water dispensing valve such that said volume of powdered drink mix and water dispensed corresponds with said volume of said fluid volume select input button selected in response to activation of said start mix switch;
    said control circuit operating said resistance heating element to heat dispensed water exiting said water dispensing valve to said temperature corresponding to said position of said warm/hot select switch before said dispensed water reaches said mixing nozzle;
    said mixing nozzle being positioned outside of said housing and having a dispensing opening for dispensing a mixture of said dispensed water and powdered beverage mix.

2. A heated beverage machine comprising:
    a housing having contained therein a water dispensing assembly, a powdered drink mix dispensing assembly, and a control circuit;
    said water dispensing assembly including a water reservoir, a water reservoir level sensor, three fluid volume select input buttons, a warm/hot select switch, a water dispensing valve in connection between said water reservoir and a mixing nozzle, a resistance heating element positioned within a section of water dispensing pipe connecting said water dispensing valve and said mixing valve, a water temperature sensor positioned within said section of water dispensing pipe at a location between said resistance heating element and said mixing valve, a water temperature display gauge, a water level display gauge, a warm temperature select indicator light, and a hot temperature select indicator light;
    said powdered drink mix dispensing assembly including powdered drink mix reservoir, a dispensing auger positioned within a dispensing pipe in connection between said mixing nozzle and said powdered drink mix reservoir, a dispensing auger position sensor, a shaker assembly positioned within said powdered drink mix reservoir, and a dispensing auger motor;
    said control circuit having inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light;
    said control circuit operating said dispenser auger motor and said water dispensing valve such that said volume of powdered drink mix and water dispensed corresponds with said volume of said fluid volume select input button selected in response to activation of said start mix switch;
    said control circuit operating said resistance heating element to seat dispensed water exiting said water dispensing valve to said temperature corresponding to said position of said warm/hot select switch before said dispensed water reaches said mixing nozzle;

said mixing nozzle being positioned outside of said housing and having a dispensing opening for dispensing a mixture of said dispensed water and powdered beverage mix.

3. A heated beverage machine comprising:

a housing having contained therein a water dispensing assembly, a powdered drink mix dispensing assembly, and a control circuit;

said water dispensing assembly including a water reservoir, a replaceable taste contaminant removing filter positioned over a fill opening of said water reservoir, a water reservoir level sensor, three fluid volume select input buttons, a warm/hot select switch, a water dispensing valve in connection between said water reservoir and a mixing nozzle, a resistance heating element positioned within a section of water dispensing pipe connecting said water dispensing valve and said mixing valve, a water temperature sensor positioned within said section of water dispensing pipe at a location between said resistance heating element and said mixing valve, a water temperature display gauge, a water level display gauge, a warm temperature select indicator light, and a hot temperature select indicator light;

said powdered drink mix dispensing assembly including powdered drink mix reservoir, a dispensing auger positioned within a dispensing pipe in connection between said mixing nozzle and said powdered drink mix reservoir, a dispensing auger position sensor, a shaker assembly positioned within said powdered drink mix reservoir, and a dispensing auger motor;

said control circuit having inputs in electrical connection with a water reservoir level sensor, a water temperature sensor, a dispensing auger position sensor, three fluid volume select input buttons, a warm/hot select switch, and on/off switch, a start mix switch, and outputs in connection with a water dispensing valve, a resistance heating element, a water temperature display gauge, a water level display gauge, a dispensing auger motor, a warm temperature select indicator light, and a hot temperature select indicator light;

said control circuit operating said dispenser auger motor and said water dispensing valve such that said volume of powdered drink mix and water dispensed corresponds with said volume of said fluid volume select input button selected in response to activation of said start mix switch;

said control circuit operating said resistance heating element to heat dispensed water exiting said water dispensing valve to said temperature corresponding to said position of said warm/hot select switch before said dispensed water reaches said mixing nozzle;

said mixing nozzle being positioned outside of said housing and having a dispensing opening for dispensing a mixture of said dispensed water and powdered beverage mix.

* * * * *